R. E. LANGMACK.
SAFETY APPLIANCE.
APPLICATION FILED FEB. 27, 1922.
1,418,720.
Patented June 6, 1922.
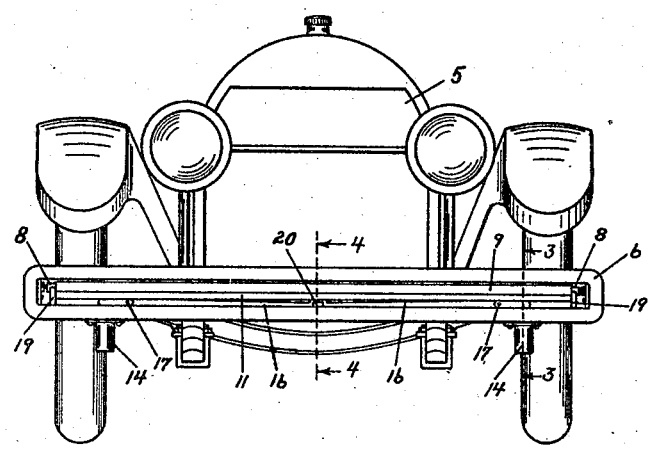
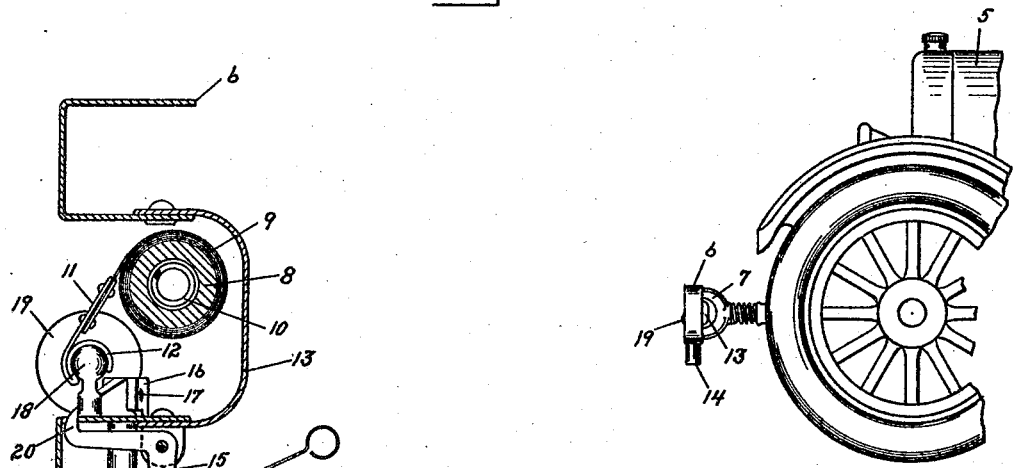
Inventor
ROY E. LANGMACK
By A. E. Carlsen
Attorney

UNITED STATES PATENT OFFICE.

ROY E. LANGMACK, OF MINNEAPOLIS, MINNESOTA.

SAFETY APPLIANCE.

1,418,720.  Specification of Letters Patent.  Patented June 6, 1922.

Application filed February 27, 1922. Serial No. 539,586.

*To all whom it may concern:*

Be it known that I, ROY E. LANGMACK, a citizen of the United States, residing at Minneapolis, in the county of Hennepin and State of Minnesota, have invented certain new and useful Improvements in Safety Appliances, of which the following is a specification.

This invention relates to safety appliances for automobiles and trucks, and the main object is to provide and combine with the bumper of a vehicle a device for catching persons who are unable to get out of the way from in front of the vehicle in time to avoid being hit and run over by it. Further objects will be disclosed in the course of the following specification, specifically pointed out in the claims and are illustrated in the accompanying drawing, in which:

Fig. 1 is a front elevation of a motor vehicle having a bumper constructed and equipped in accordance with my invention.

Fig. 2 is a side view, as seen from the right in Fig. 1.

Fig. 3 is an enlarged detail sectional view on the line 3—3 of Fig. 1, showing the device as sprung out or released.

Fig. 4 is an enlarged detail sectional view on the line 4—4 in Fig. 1, showing the device as rolled up and set.

Referring to the drawing more particularly and by reference characters 5 designates a motor vehicle, to the front end of which is suitably secured a bumper 6. The bumper 6 is made preferably in the shape of an elongated channel frame, secured to the car by suitable brackets 7, and is provided with a narrow opening between the upper and lower channels of the frame in which is mounted my improved safety appliance.

A roller 8 is secured at its ends to the ends of the bumper and is mounted in the space between the two channels thereof. An apron 9 is rolled about said roller 8 and a spring 10, within the roller, tends to keep said apron normally wound up on the roller, in much the same manner that the ordinary window shade is actuated.

The outer end of the apron 9 is provided with a heavy sheet metal edge member 11, which is formed into a ball race channel 12 at its under side. When the device is set, as it normally is, the member 11 hides much of the appliance from view, while a casing 13 protects it from the rear.

Near the ends of the bumper 6 and under the lower channel thereof is secured a pair of cylinders 14, in each of which is rotatably mounted a bar 15 which projects up through said channel and is provided with a swinging arm 16. Each arm 16 is provided with a joint 17 so that when swung out in front of the bumper the outer section of the arm will fall down to an inclined position, as illustrated in Fig. 3. The outer end of each arm 16 is provided with an integrally formed ball 18 adapted to travel in the ball race 12. At the ends of the member 11 are provided a pair of small wheels or rollers 19, which support and keep it off of the ground when the apparatus is sprung.

When the device is set the arms 16 are in substantial alinement with each other, with the ball ends thereof close together. The arms are releasably held in this position by a latch 20 on the end of a bell crank lever 21. The latch is normally held in engagement with the inner ends of the arms 16, by a spring 22, but may be quickly released by a wire 23, which leads to a convenient position for manipulation by the driver. The springs 24 (see Fig. 3), within the cylinders 14, turn the bars 15 when the arms 16 are released, thus throwing said arms forward and outward, as desired.

The operation and use of the device may be briefly described as follows: When the truck or other car on which the appliance is installed is in danger of striking some person, and the car is traveling at such speed or is so heavy that it cannot be stopped in time to avoid the accident, the driver pulls the wire 23, releasing the catch 20, and, of course simultaneously shuts off his gas and applies his brakes. As the arms 16 swing forward they also drop down from the joint 17 until the rollers 19 hit the pavement and travel forward thereon. By this time the arms 16 are about parallel and form a rigid and substantial support for the apron 9. As the person in danger is then struck by the member 11 he will invariably fall back on the apron which will prevent him from being severely bruised or killed by the wheels of the car, while the latter is being brought to a full stop. The device is then again reset by pulling in the arms 16 and rolling up the curtain.

It will of course be obvious that this appilance will not in any way affect the functioning of the bumper, as such, when it is called into use for the purpose for which it is intended.

It is further understood that suitable modifications may be made in the general design and structural details of this device, provided, however, that such modifications come within the spirit and scope of the appended claims.

Having now therefore fully shown and described my invention what I claim to be new and desire to protect by Letters Patent is:

1. A device of the class described, consisting of a roller suitably mounted on the front end of a motor vehicle, an apron wound on said roller, a rigidly formed edge member on the end of said apron, supporting arms positioned under said roller and pivotally mounted at their outer ends to a rigid support, said arms having joints near their outer ends, and means for swinging the inner ends of said arms forward together with said apron.

2. A device of the class described comprising, a roller mounted on the front end of a motor vehicle, an apron wound on said roller, jointed supporting arms mounted at their outer ends on fixed vertical pivots and having their inner ends slidably connected to the edge of said apron, and means for swinging the inner ends of said arms forward together with said apron.

3. A device of the class described comprising, a holder mounted on the front end of a motor vehicle, an apron having one end secured within the holder, the other end being adapted to extend forwardly therefrom, apron supporting arms each pivotally secured at one end to the holder on a vertical pivot so as to swing forwardly horizontally and support the apron when extended, said supporting arms having joints near their pivoted ends so that they may drop down when extended.

4. A device of the class described comprising, a holder mounted on the front end of a motor vehicle, an apron having one end secured within the holder the other end being free to be extended forwardly therefrom, apron supporting arms mounted on vertical pivots in said holder, releasable means for swinging the arms forward, and means for allowing said arms to drop down when swung forward.

5. A device of the class described comprising a holder mounted on the front end of a motor vehicle, an apron having one end secured within the holder, the other end being free to be extended forwardly therefrom, vertical pivot bars rotatably mounted near the ends of the holder, supporting arms secured at their outer ends to said pivot bars, the inner ends of the supporting arms being slidably secured to the free end of the apron, and releasable spring means for rotating said bars to swing the arms forward.

6. A device of the class described consisting of a holder mounted on the front end of a motor vehicle, a roller mounted in the holder, an apron having one end secured to the holder, the other end being free, a pair of supporting arms positioned normally beneath the roller, said arms having their inner ends slidably engageable with the free end of the apron, means for pivotally securing the outer ends of the supporting arms on vertical pivots so that they may swing forward horizontally, means for swinging the arms forwardly, and a joint in each of said arms near said pivoted ends so that they may drop down when swung forward.

7. In a device of the class described and in combination with an apron and a pair of supporting arms adapted to swing forward and support the apron, of a metallic strip secured to the front end of the apron, said strip being bent back upon itself and curved to form a longitudinal ball race, and balls formed integrally with the swinging ends of said arms, said balls slidably engaging said ball race.

In testimony whereof I affix my signature.

ROY E. LANGMACK.